April 3, 1956  G. K. REYL  2,740,389
MULTI-CYLINDER INTERNAL COMBUSTION ENGINE
Filed Dec. 16, 1953  4 Sheets-Sheet 1

INVENTOR
Gaston Karl Reyl
By Walter Becker
Patent Agent

April 3, 1956     G. K. REYL     2,740,389

MULTI-CYLINDER INTERNAL COMBUSTION ENGINE

Filed Dec. 16, 1953     4 Sheets-Sheet 2

INVENTOR
Gaston Karl Reyl
By
Patent Agent

April 3, 1956  G. K. REYL  2,740,389
MULTI-CYLINDER INTERNAL COMBUSTION ENGINE
Filed Dec. 16, 1953  4 Sheets-Sheet 3

1St overvibration
(oscillation form of
second degree)

fundamental
(oscillation form of
first degree)

3rd harmonic $\cos m\alpha_z$ : ignition sequence
1-5-3-6-2-4

$\cos m\alpha_z$ : ignition sequence
1-2-4-6-5-3

*INVENTOR*
Gaston Karl Reyl
By Walter Buhler
Patent Agent

April 3, 1956  G. K. REYL  2,740,389
MULTI-CYLINDER INTERNAL COMBUSTION ENGINE
Filed Dec. 16, 1953  4 Sheets-Sheet 4

FIG. 15b
6th harmonic

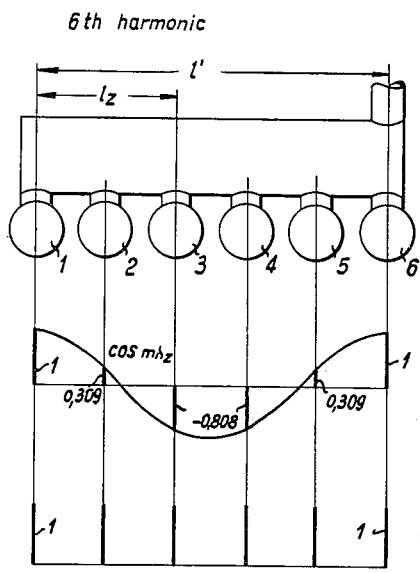

$\cos m\alpha_z$ : ignition sequence
1-5-3-6-2-4

FIG. 16

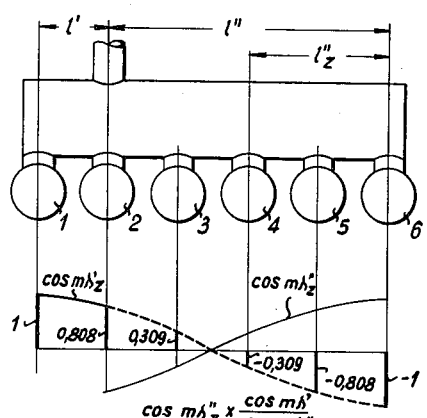

FIG. 17

Ignition sequence
3rd harmonic

|   | $m\alpha_z$ | 1<br>$\cos m\alpha_z$ | $m\lambda_z$ | 2<br>$\cos m\lambda_z$ | 3 =<br>1 × 2 | 6th harmonic<br>$m\lambda_z$ | $\cos m\lambda_z$ |
|---|---|---|---|---|---|---|---|
| 1 | 0° | +1 | 0° | 1 | +1 | 0° | +1 |
| 2 | 360° | +1 | 36° | 0,808 | +0,808 | 72° | +0,309 |
| 3 | 360° | +1 | 72° | 0,309 | +0,309 | 144° | -0,808 |
| 4 | 180° | -1 | 108° | -0,309 | +0,309 | 216° | -0,808 |
| 5 | 180° | -1 | 144° | -0,808 | +0,808 | 288° | +0,309 |
| 6 | 180° | -1 | 180° | -1,0 | +1 | 360° | +1 |
|   |   |   |   |   | Σ = 4,234 |   | Σ = 1,002 |

3rd harmonic

|   | $m\alpha_z$ | 1<br>$\cos m\alpha_z$ | 2<br>$\cos m\lambda_z$ | 3 =<br>1 × 2 |
|---|---|---|---|---|
| 1 | 0° | +1 | 1 | +1 |
| 2 | 180° | -1 | 0,808 | -0,808 |
| 3 | 180° | -1 | 0,309 | -0,309 |
| 4 | 360° | +1 | -0,309 | -0,309 |
| 5 | 360° | +1 | -0,808 | -0,808 |
| 6 | 180° | -1 | -1 | +1 |
|   |   |   |   | Σ = -0,234 |

Ignition sequence 1-2-4-6-5-3

FIG. 18

INVENTOR
Gaston Karl Reyl
By
Patent Agent

United States Patent Office 2,740,389
Patented Apr. 3, 1956

2,740,389
MULTI-CYLINDER INTERNAL COMBUSTION ENGINE

Gaston Karl Reyl, Koln-Riehl, Germany, assignor to Klöckner-Humboldt-Deutz Aktiengesellschaft, Koln-Deutz, Germany Application December 16, 1953, Serial No. 398,576

Claims priority, application Germany December 18, 1952

11 Claims. (Cl. 123—52)

The present invention relates to internal combustion engines and, more particularly, concerns multi-cylinder internal combustion engines of the air compressing type or the air-gas mixture compressing type, which comprise a collecting manifold receiving the combustion air or air-gas mixture and communicating with the feed conduits of a plurality of axial flow or radial flow blowers or with the feed conduit of one blower only.

During the operation of internal combustion engines of this type, the combustion air or mixture in the collecting manifold is subjected to oscillations in view of the periodically occurring withdrawal of such combustion air or mixture. These oscillations are conveyed to the blower or blowers through the feeding conduit means for the respective combustion air or mixture and under certain circumstances may harmfully affect the operation of such blower or blowers in an inadmissible manner. Due to the particular delivery charcteristic of turbo blowers, according to which, at the obtainment of a certain control pressure, the blower does not work any longer in a stable manner but its output falls off, it may occur that periodically appearing pressure fluctuations caused in the feeding conduit and brought about by oscillations in the collecting manifold will force the blower periodically to work alternately in a stable and in an unstable range. These harmful oscillations naturally develop to a particularly great extent when the natural frequency of the gaseous medium in the collecting manifold which may be considered closed (or the system consisting of the collecting manifold and feeding conduits) is in resonance with the speed of revolution of the engine or a multiple thereof.

It is, therefore, an object of this invention to provide an arrangement which will overcome the above mentioned drawbacks.

It is another object of this invention to arrange the tap or connecting points of the collecting manifold, from which the respective gaseous medium is fed to the cylinders, in such a manner that no harmful effects will be exerted upon the blower or blowers.

Still another object of this invention consists in that the firing order for the internal combustion engine is so selected that in the collecting manifold no oscillations will occur which might cause the blower alternately to work in a stable and unstable range.

These and other objects and advantages of the invention will appear more clearly from the following specification in connection with the accompanying drawings in which.

Figs. 5 to 10 diagrammatically illustrate various embodiments for a collecting manifold of an internal combustion engine according to the present invention.

Figure 11:
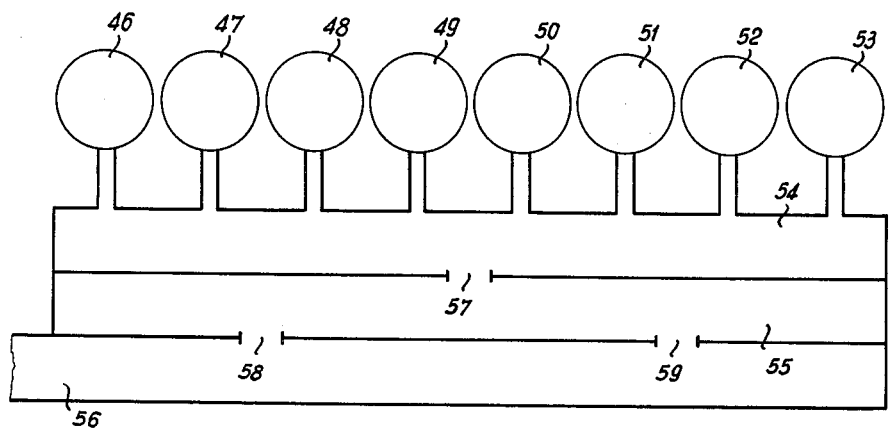
Figure 12:
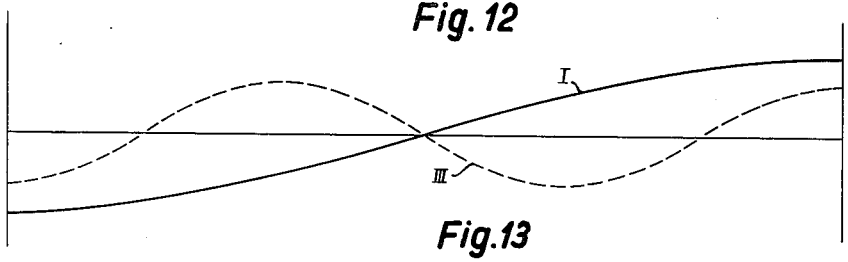
Figure 13:
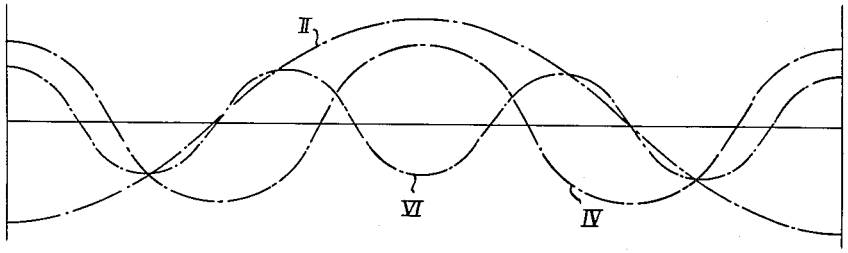

Figs. 11 to 13 illustrate the repeated employment of the main inventive feature of the present invention in connection with one and the same engine.

Figs. 14 to 18 illustrate the conditions of oscillation in connection with a specific calculating example for applying the present invention to a six-cylinder two-stroke cycle internal combustion engine.

General arrangement

According to the present invention the tap connections of the collecting manifold for the gaseous medium to be fed to the cylinders are so arranged and/or the firing order for the internal combustion engine is so selected that during operation, by causing the oscillations occurring in the collecting manifold in view of the periodically effected discharge of gaseous medium to form nodes (standing waves) one or a plurality of zones are created which are subjected to no or only minor fluctuations of pressure and that the feeding into the collecting manifold is effected within the range of these zones. The design of the internal combustion engine according to the present invention may vary in any desired appropriate manner.

According to a further development of the invention, the collecting manifold for the combustion air or the mixture may for instance be provided with a longitudinally extending partition, one divided-off chamber communicating with the feeding device, and the other divided-off chamber communicating with withdrawing conduits. The partition is provided with passage means within the range of one or, if desired, within the range of a plurality of feeding-in zones or gaseous medium receiving zones. The divided-off chamber communicating with the withdrawing conduits may additionally be provided with one or a plurality of transverse walls.

According to a further development of the invention, the collecting manifold may be designed as ring conduit or closed circular pipe line. Particularly in those instances in which the collecting manifold is located between two cylinder banks, it is advantageous to lead the feeding conduit into the collecting manifold and to provide the feeding conduit with passage means within the range of the feeding-in zones. For reasons of saving space, it may in certain instances be advantageous to pass the pressure conduit of the blower and the collecting manifold separately through the cylinder bank to be fed and along said cylinder bank and to interconnect said pressure conduit and said collecting manifold by means of one or a plurality of conduits preferably passing through between said cylinders. Within the ambit of the invention, it may also be advantageous within the range of the feeding-in zones to provide guide vanes for the oncoming gaseous medium.

Furthermore, in conformity with a further development of the invention, by repeatedly employing the basic principle of the invention on one and the same engine it is possible to an even greater extent to prevent disturbances caused by oscillations in the inlet system from reaching the feeding conduit and thus the blower. To this end, according to the present invention one or a plurality of intermediate collecting containers is provided between the feeding conduit and the main discharge chamber which comprises the tap connections, while the feeding-in is effected through said intermediate collecting container or containers in such a manner that in addition to the fundamental oscillation as many harmonic oscillations as possible will be prevented from affecting the conditions in the feeding conduit. This arrangement is based on the finding that oscillations occurring in the discharging chamber provided with tap connections may possibly harmfully affect the conditions in the feeding conduit if said oscillations do not form nodes within the provided feeding-in zones. A portion of such disturbing oscillations will in conformity with the above mentioned arrangement be prevented from affecting the conditions in the feeding conduit by arranging an intermediate collecting container between the feeding conduit and the main discharge chamber and by effecting the feeding-in from the feeding conduit into said intermediate container in conformity with the essence of the invention within zones in which the harmonic oscillations to be eliminated will form nodes. The harmonic oscillations which might still leave said intermediate container may then in similar manner be eliminated by arranging further intermediate collecting containers. The number of the serially arranged intermediate containers will in each instance depend on the steadying degree desired in the feeding conduit.

Structural arrangement

Figure 1:
Fig. 1 illustrates a pipe closed at both ends and filled with a gaseous medium carrying out oscillations.
Figure 2:
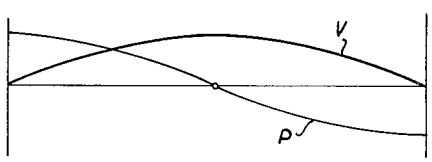
Figs. 2 to 4 represent graphs explaining the cause of the oscillations in the pipe according to Fig. 1.

Referring now to the drawings, the collecting manifold passing along the cylinders of a multi-cylinder internal combustion engine may be considered as a closed tube in conformity with the showing of Fig. 1. It may furthermore be assumed that the tap connections for the discharge conduits are symmetrically or nearly symmetrically arranged along said collecting manifold and are evenly or nearly evenly spaced from each other. With these assumptions, it will be clear that the individual particles of the gaseous medium in the collecting manifold will during the operation of the internal combustion engines be caused to perform oscillations of different characteristic depending on the firing order (and frequency of excitation). The occurring total oscillation may be considered sub-divided into individual harmonic partial oscillations the myth harmonic oscillation oscillating as pure sine oscillation with the $m$-multiple engine fundamental frequency. With a correspondingly selected firing order, for instance in the manifold shown in Fig. 1, all particles (partially dotted in the drawing) of the enclosed medium carry out oscillations in the longitudinal direction of the manifold which oscillations are at any time equidirectional and which when plotted over the time (for the harmonic oscillation involved) are of sine shape. The amplitudes of said sine-shaped oscillations plotted over the length of the collecting conduit can be derived from the graph V shown in Fig. 2. Inasmuch as with such oscillations, the pressure is a minimum in those pipe sections in which the molecules of the medium oscillate with greatest amplitude, and is a maximum in those pipe sections in which the molecules oscillate with smallest amplitude, the velocity graph V has associated therewith a pressure graph P having the characteristic shown in Fig. 2. From this pressure graph P it will be obvious that the combustion air or the mixture in the pipe or manifold will oscillate in a manner of a surging water wave alternately running against the ends of said pipe or manifold. When causing this fundamental oscillation, a zone of constant pressure will be present in the center of the tube or manifold as will be clear from Fig. 2 into which zone the feeding-in of combustion air or mixture may be effected while avoiding pressure fluctuations in the feeding conduit. By selecting another firing order or if a certain given firing order is to be observed, by varying the connections of the collecting manifold with the discharge or withdrawing conduits, it is possible to bring about a different form of oscillation.

Figure 3:
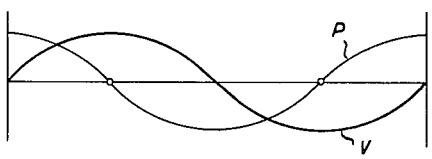
Figure 4:
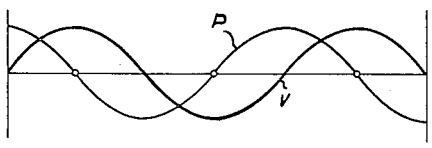

In this connection reference may be had to Fig. 3 which shows the course of the velocity and the pressure graph when the first harmonic oscillation is brought about, while Fig. 4 shows the course of said two graphs when exciting the second harmonic oscillation. When exciting the first harmonic oscillation, the pressure graph passes twice through zero, whereas when exciting the second harmonic oscillation the pressure graph passes three times through zero. In other words, in the first instance two feeding-in zones and in the second instance three feeding-in zones will be available. When designing an internal combustion engine in conformity with the principle of the present invention, the calculating formulas customary in connection with the calculating of oscillations may be employed. With symmetrically feeding in for instance, i. e. when the feeding-in point is equally distanced from both ends of the collecting conduit or manifold, a node is assured for the $m$th harmonic oscillation if for cylinders which are equally distanced from the feeding-in points, the product $m\alpha$ equals $180°^{KW}$, the firing time of one cylinder being spaced from the firing time of the second cylinder by $\alpha°^{KW}$. When feeding-in into a feeding conduit closed at both ends and spaced by the distance of $l'$ and $l''$ respectively from both ends, the exciting components refer to the feeding-in point of the cylinder $z$ which is arranged in the section $l'$ and the firing point of which follows later by $d_z°^{KW}$ with regard to a cylinder 1 selected at random, are represented by $$\cos m\alpha_z \frac{\cos \frac{6nml_z}{a}}{\cos \frac{6nml'}{a}}$$

and $$\sin m\alpha_z \frac{\cos \frac{6nml_z}{a}}{\cos \frac{6nml'}{a}}$$

In this formula $l_z$ indicates the distance of the cylinder from the closed end of the conduit or manifold, whereas $m$ stands for the order number of the excited oscillation, $n$ indicates the number of revolutions at which the steadying is supposed to occur, and $a$ indicates the sound velocity of the air in the suction pipe. In the above explanations $°KW$ means degree of crankshaft angle.

Figure 5:
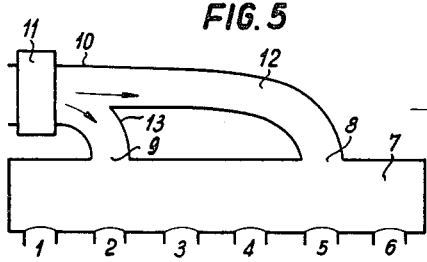

The collecting conduit 7 illustrated diagrammatically in Fig. 5 is provided for use in connection with an air compressing 6-cylinder internal combustion engine not shown in the drawing. The collecting conduit 7 has the shape of a pipe closed at both ends and is provided with six symmetrically distributed tap connections or discharge openings 1, 2, 3, 4, 5 and 6. With a firing order 1,6—2,5—3,4, it is possible by means of the sixth harmonic oscillation in the collecting conduit to excite the first harmonic oscillation so that the pressure curve will have a characteristic according to Fig. 3, and two feeding-in zones free from any reactive effect will be available for the combustion air. The combustion air is passed into these zones through openings 8 and 9 through the intervention of two branch conduits 12 and 13 branching off from the pressure conduit 10 of an axial flow blower 11. It is a matter of course that one feeding-in alone through the opening 8 or 9 will assure success. It is also possible that each zone has associated therewith a separate blower or that the feeding-in is effected only into one zone.

Figure 6:
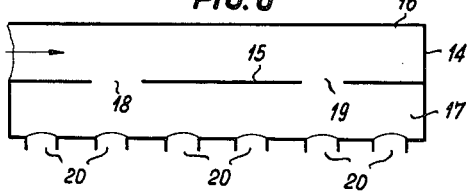

The collecting container 14 illustrated in Fig. 6 for a 6-cylinder internal combustion engine according to the present invention is sub-divided into two chambers 16 and 17 by means of a longitudinally extending partition 15. The mixture or combustion air is fed into the chamber 16 and through openings 18 and 19 passes into the chamber 17 having connected thereto the discharge conduits 20. The openings 18 and 19 are arranged within the range of the feeding-in zones of the chamber 17.

Figure 7:
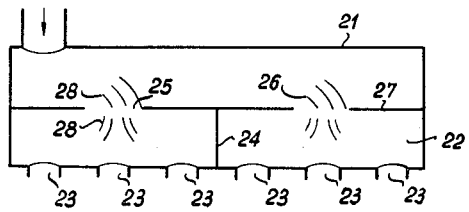

The collecting manifold 21 illustrated in Fig. 7 differs from that of Fig. 6 in that the divided-off chamber 22 having connected thereto the discharge conduits 23 of the cylinder is sub-divided by a transverse wall 24 and that guide vanes 28 are arranged in the partition 27 within the range of the passages 25 and 26.

Figure 8:
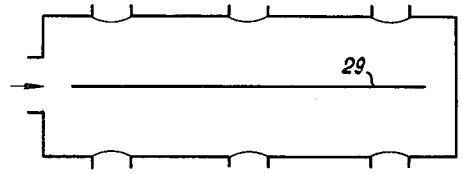

Fig. 8 shows a collecting conduit which by means of a partition 29 is designed as a ring conduit closed in itself.

Figure 9:
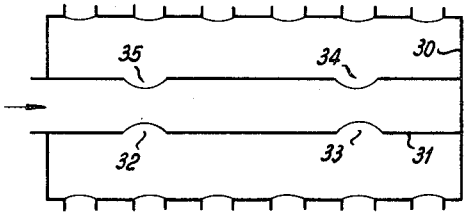

Fig. 9 represents a collecting conduit or manifold for a 12-cylinder internal combustion engine. An internal combustion engine is involved which comprises two cylinder banks arranged in V-shape with regard to each other, with each cylinder bank comprising six cylinders. The collecting manifold 30 is arranged in the V-shaped space between the cylinder banks. The collecting container 30 surrounds the feed conduit 31 for the mixture or combustion air. From the feed conduit 31, the gaseous medium passes through openings 32, 33, 34 and 35 within the range of the feeding-in zones into the collecting container.

Figure 10:
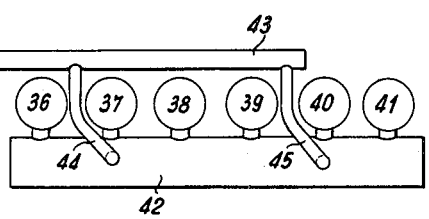

Fig. 10 diagrammatically illustrates a top view of a 6-cylinder internal combustion engine. The cylinders are designated by the reference numerals 36, 37, 38, 39, 40 and 41. The suction manifold 42 extends along one side of the cylinder bank, and feed conduits branching off from the manifold 42 lead to the individual cylinders. On the other side of the cylinder bank there is provided a feed conduit 43 which is connected to a blower (not shown in the drawing). The feed conduit 43 and the manifold 42 communicate with each other through two conduits 44 and 45. The said last mentioned conduits pass between two cylinders and lead into the manifold 42 within the range of the feeding-in zones in conformity with the present invention.

With the feeding-in system diagrammatically illustrated in Fig. 11, the working cylinders are designated with the reference numerals 46 to 53. The cylinders withdraw air or an air-gas mixture from the main discharge chamber 54 which latter is fed from the feeding conduit 56 again through an intermediate container which in this instance is designated by the reference numeral 55. The passage of the gaseous medium from the intermediate container 55 into the main discharge chamber 54 is effected through openings 57. As will be clear from Fig. 12, the fundamental oscillation I and the third harmonic oscillation III and all further not illustrated oblique symmetrical harmonic oscillations within the range of this passage 57 form a node so that they cannot pass into the intermediate container 55 with a disturbing effect. Only the symmetrical harmonic oscillations with 2, 4, 6 . . . nodules according to Fig. 13 will occur in the intermediate container 55. Inasmuch as the gaseous medium passes from the feeding conduit into the intermediate collecting container 55 through two openings 58 and 59 each of which is spaced from the adjacent end of the container by one fourth of the length of the container 55, only those oscillations in the intermediate container 55 are prevented from passing into the feeding conduit which form nodes within the range of the openings 58 and 59. As will be clear from Fig. 13 these are the IInd, VIth, Xth etc. harmonic oscillations. It will thus be clear that only the oscillations with 4, 8, 12, etc. nodules pass from the intermediate collecting container 55 into the feeding conduit 56.

*Example*

It may be assumed that the invention is to be applied to a 6-cylinder two stroke cycle internal combustion engine, the scavenging air collecting manifold or container of which, including the connecting conduits to the cylinders has an effective length of $l=2.2$ meters. Resonance will occur for the fundamental oscillation (oscillation form of first degree) with one node at a sound velocity of $a=350$ meters per second, for $$\frac{l}{a} m \frac{n\pi}{30} = \pi$$

or $mn=4800$, which for the third harmonic with $m$ equalling 3 corresponds to a speed of rotation of $n=1600$ revolutions per minute. At the same time, the sixth harmonic establishes resonance with the first over-vibration with two nodes and $$\frac{l}{a} m \frac{n\pi}{30} = 2\pi$$

Figure 14:
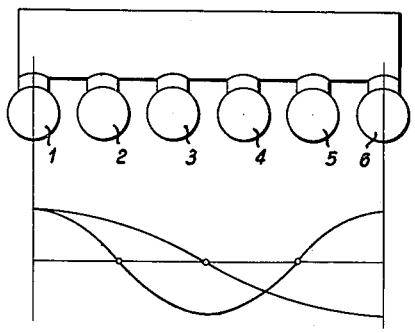

(oscillation form of second degree) (Fig. 14). The ignition interval amounts to $\alpha=60°\text{KW}$ (60° crank angle).

For the ignition sequence 1-5-3-6-2-4 and the third harmonic $m\alpha_z$ alternately becomes 360° and 180° so that all $\sin m_z$ disappear and the $\cos m\alpha_z$ alternately become $+1$ and $-1$. If now the feeding in occurs at the collecting manifold end at cylinder 6 (Fig. 15), the sum of the excitations becomes $s \cos m\alpha_z \cos m\lambda_z = 4.234$ (Fig. 17), and for the sixth harmonic with $m\alpha_z=360°$ for all cylinders, $s \cos m\alpha_z \cos m\lambda_z = 1.002$ so that in the feeding conduit very great pressure fluctuations are to be expected (the factor $$\frac{l}{\cos \lambda'}$$

is common to all excitations and therefore can be omitted.

By feeding into the center of the collecting manifold at the pressure node of the oscillation of the first degree, the third harmonic can be shielded from the feeding conduit, the sixth harmonic, however, has an anti-node at this point and is nevertheless noticeably excited with 1.002. The sixth harmonic cannot be influenced by changing the ignition sequence because for each ignition sequence $m\alpha_z=360°$; therefore, it is advisable here to feed-in at the oscillation node of the first over-vibration (oscillation form of second degree, Fig. 16), and to reduce the influence of the third harmonic by changing the ignition sequence.

If the ignition sequence 1-2-4-6-5-3 is selected, with the original feeding-in at the collecting manifold end an excitation sum of 0.234 remains, i. e. almost 20 times less than with the first ignition sequence, Fig. 18.

Figure 15A:
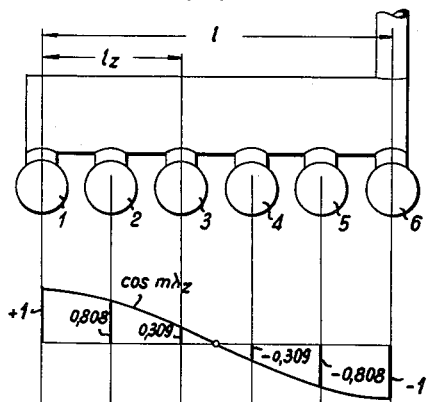
Figure 15A:
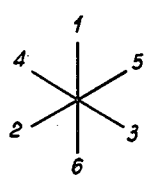
Figure 15A:
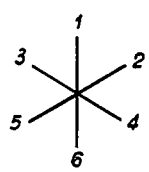

The same minor excitation for the third harmonic can also be obtained for the pressure node of the sixth harmonic, Fig. 16. In this connection it should be noted that for the cylinders left of the nodes the sums $$\sum \cos m\alpha_z \frac{\cos m\lambda'_z}{\cos m\lambda'}$$

and for the cylinders right of the nodes, the sums $$\sum \cos m\alpha_z \frac{\cos m\lambda''_z}{\cos m\lambda''}$$

have to be added. If the factor $$\frac{l}{\cos \lambda'}$$

is eliminated, for the cylinders right of the nodes, the sum $$\sum \cos m\alpha_z \cos m\lambda''_z \frac{\cos m\lambda'}{\cos m\lambda''}$$

have to be formed. As will be clear from Fig. 16, $$\cos m\lambda''_z \frac{\cos m\lambda''}{\cos m\lambda'}$$

equals $\cos m\lambda_z$ in Fig. 15 so that the same total sum of excitations will be obtained for the feeding-in point as in Fig. 17.

By feeding-in at the pressure nodes of the sixth harmonic which is in resonance, and by simultaneous change in the ignition sequence, it is possible in the manner shown above, to keep the influence of the third and sixth harmonics away from the feeding conduit.

The application of the invention is not limited to the embodiments listed in the preceding specification but may also be applied in connection with different types of collecting conduits or collecting containers. The invention may also advantageously be applied in connection with multi-cylinder piston blowers which work under the same or similar conditions as multi-cylinder internal combustion engines with regard to the supply of air.

It is also to be understood that the present invention is, by no means, limited to the particular arrangements illustrated in the drawings but also comprises any modifications within the scope of the appended claims.

What I claim is:

1. In an internal combustion engine having a plurality of cylinders: collector means for receiving gaseous means for use in connection with a combustion process, at least one blower, first conduit means connecting said blower with said collector means, second conduit means leading from said collector means to said cylinders, said first conduit means having the points of connection thereof with said collector means located within at least one zone which during the operation of the engine and the periodically occurring withdrawal of said gaseous means from said collector means is subjected to the smallest pressure fluctuations only as they occur in said collector means.

2. In an internal combustion engine having a plurality of cylinders: collector means for receiving gaseous means for use in connection with a combustion process, at least one blower, first conduit means connecting said blower with said collector means, and second conduit means leading from said collector means to said cylinders, the connecting points of said second cylinders with said collector means being arranged so that during the operation of said engine the oscillations produced in said collector means by the periodically occurring withdrawal of said gaseous means from said collector means comprise at least one zone at least nearly free from pressure fluctuations, said first conduit means leading into said collector within such zone.

3. A method of causing blower means associated with internal combustion engines for feeding gaseous means into a collector of an internal combustion engine to work within a substantially stable range during the periodically occurring withdrawal of said gaseous means from said collector into a plurality of cylinders the steps of: creating in said collector at least one zone free from pressure fluctuations during the periodical withdrawal of said gaseous means into said cylinders, and feeding said gaseous means by said blower means into said collector within the range of such zone.

4. A method of causing blower means associated with internal combustion engines for feeding gaseous means into a collector of an internal combustion engine to work within a substantially stable range during the periodically occurring withdrawal of said gaseous means from said collector into a plurality of cylinders the steps of: creating in said collector at least one zone free from pressure fluctuations during the periodical withdrawal of said gaseous means into said cylinders by selecting a predetermined firing order for the internal combustion engine so that the oscillations in said collector will include a nodal point within said collector to thereby bring about a zone subjected at best to very minor pressure fluctuations, and feeding the gaseous means conveyed by said blower means into said collector at said nodal point.

5. In an internal combustion engine having a plurality of cylinders, collector means for receiving gaseous means for use in connection with a combustion process, said collector means being provided with a longitudinally extending partition sub-dividing said collector means into a first chamber and into a second chamber, at least one blower, first conduit means interconnecting said blower and said first chamber, second conduit means connecting said second chamber with said cylinders, said first conduit means having the points of connection thereof with said collector means located in at least one zone which during the operation of the engine and the periodically occurring withdrawal of said gaseous means from said collector means is at best subjected to the smallest pressure fluctuations only, said partition being provided with passages for effecting communication between said first chamber and said second chamber, said passages being located within the range of said zone.

6. An arrangement according to claim 5, in which said second chamber is provided with at least one transverse wall.

7. In an internal combustion engine having a plurality of cylinders: collector means including a circuit closed in itself for receiving gaseous means for use in connection with a combustion process, at least one blower, first conduit means connecting said blower with said collector means, second conduit means leading from said collector means to said cylinders, said first conduit means having the points of connection thereof with said collector means located within at least one zone which during the operation of the engine and the periodically occurring withdrawal of said gaseous means from said collector means is subjected to the smallest pressure fluctuations only occurring in said collector means.

8. In an internal combustion engine having a plurality of cylinders: collector means for receiving gaseous means for use in connection with a combustion process, at least one blower, first conduit means connecting said blower with said collector means and surrounded by said collector means, second conduit means leading from said collector means to said cylinders, said first conduit means being provided with passage means located within at least one zone which during the operation of the engine and the periodically occurring withdrawal of said gaseous means from said collector means is subjected to the smallest pressure fluctuations only occurring in said collector means for conveying gaseous means through said passage means into said collector means.

9. In an internal combustion engine having a plurality of cylinders arranged in line, collector means located on one side of said cylinders for receiving gaseous means for use in connection with a combustion process, first conduit means arranged to receive said gaseous means from a blower and located on the other side of said cylinders, second conduit means passing between said cylinders and interconnecting said first conduit means and said collector means, third conduit means leading from said collector means to said cylinders, said second conduit means having the points of connection thereof with said collector means located in at least one zone which during the operation of the engine and the periodically occurring withdrawal of said gaseous means from said collector means is subjected to the smallest pressure fluctuations only as they occur in said collector means.

10. An arrangement according to claim 1, which includes guide vanes within the zone in which the points of connection of said first conduit means with said collector means are located.

11. In an internal combustion engine having a plurality of cylinders: a main collector chamber for receiving gaseous means for use in connection with a combustion process, first conduit means arranged to receive said gaseous means from a blower and communicating with said first collector chamber, and at least a second collector chamber, second conduit means leading from said second collector chamber to said cylinders, said first conduit means having the points of connection thereof with said first collector chamber located in at least one zone which during the operation of the engine and the periodically occurring withdrawal of gaseous means from said first collector chamber is at best subjected to minor pressure fluctuations only, said second collector chamber communicating with said first collector chamber through passage means located so that in addition to the fundamental oscillation as many harmonic oscillations as possible are excluded from affecting the feeding conditions in said first conduit means.

References Cited in the file of this patent

UNITED STATES PATENTS 2,305,946  Wilson et al. _____ Dec. 22, 1942